Jan. 12, 1965  J. A. WHITE  3,165,078
PALLET
Filed Nov. 5, 1962
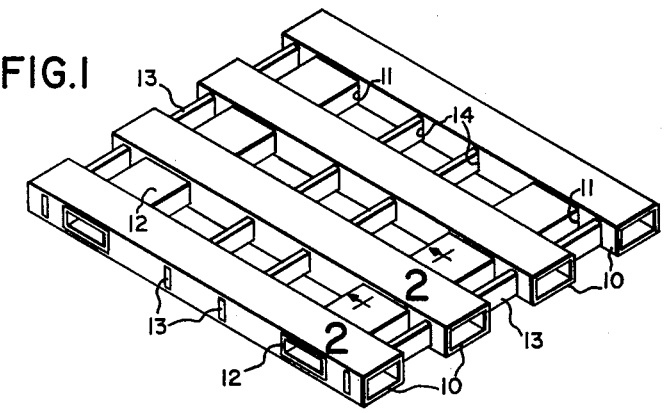
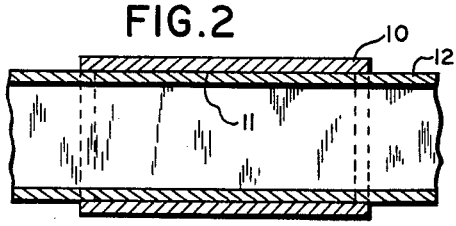 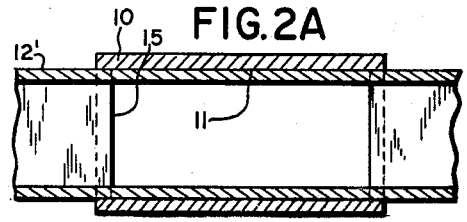
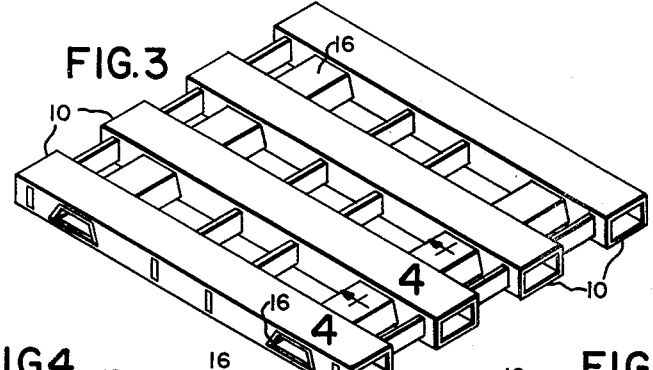
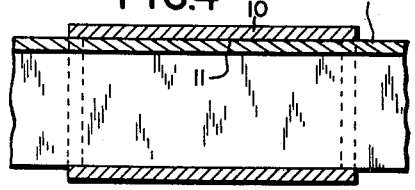 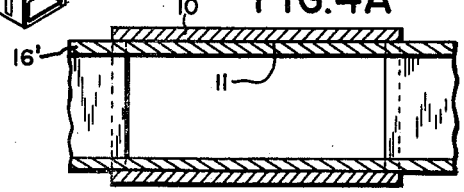
INVENTOR.
JAMES A. WHITE
BY
*George C. Limbach*
ATTORNEY

United States Patent Office 3,165,078
Patented Jan. 12, 1965

3,165,078
PALLET
James A. White, San Rafael, Calif., assignor to
Materials, Inc., San Rafael, Calif.
Filed Nov. 5, 1962, Ser. No. 235,489
3 Claims. (Cl. 108—56)

The present invention relates in general to pallets and more particularly to an improved expendable pallet which is capable of supporting loads of many tons and which when unassembled can be transported flat.

Load-supporting shipping pallets have found considerable use in the storage and transportation of goods. The savings in labor handling is considerable when goods can be palletized and shipped with the pallet to their destination.

Heretofore, load-supporting pallets have usually been made of wooden parts and constructed with passageways between the top and bottom surfaces for receiving the lift forks of manual or power operated stevedore trucks and similar material-handling equipment. Some attempt has also been made to construct pallets of this character out of metal parts. In either event the cost of materials heretofore use has been relatively high, and although it would be desirable to expend the pallet after shipping of the load, the high cost of manufacturing even the simple wooden pallets has ruled out this possibility. The return of empty pallets entails a tremendous job, and furthermore, pallets of heavy materials as wood and metal add to the shipping cost when the shipping charges are made by weight.

A novel expendable pallet is described in U.S. Patent No. 2,958,494 to Harold A. Lovegreen, assigned to the assignee of the present invention. The patent discloses an expendable pallet comprising a sheet of corrugated paper or the like, which is folded to produce top and bottom panels and a plurality of supporting means passed through the side panels connecting the top and bottom panels in a spaced apart relation. The pallet illustrated in the drawing of the referenced patent requires a flat sheet of material such as cardboard, which when folded determines the width and length of the pallet. For a pallet constructed as illustrated in the drawing of the referenced patent a different size sheet of material is necessary for pallets of different widths and for pallets of different lengths or heights where the height or length respectively, cannot be adjusted for the other change in dimension.

Furthermore, pallets of the type illustrated in the referenced patent are somewhat difficult to assemble since the support members have to be threaded into the openings in the flat sheet between alternate top and bottom panels.

For different types of goods it is desirable to have different sized pallets. Therefore, it is desirable to have a pallet whose component parts are put together in such a manner that a certain size component part can be utilized for a number of different size pallets.

According to the present invention a pallet is provided which is made from a plurality of tubular members or open-ended boxes which are held in parallel spaced apart relation by a plurality of support members passing through apertures in the tubular members, the support members being channel members or tubular members or boxes. Such a pallet is made to be a four-way pallet, i.e. to receive lift forks from all four sides by providing lift fork receiving apertures in the sides of the support members.

In assembling a pallet according to the present invention the support member can be passed through each tubular member in its turn, and there is no difficulty in handling one sheet through which the support member must be passed several times.

The object of the present invention is to provide an improved inexpensive expendable pallet which can be easily assembled, which is capable of supporting loads of many tons, which when knocked down can be transported flat, and certain components of which can be utilized for pallets of several different sizes.

One feature of the present invention is the provision of a novel pallet made from a plurality of elongated tubular members aligned and held in substantially parallel spaced apart relation to one another by means of the plurality of spaced apart support members passing through apertures in the sides of the tubular members.

Another feature of the present invention is the provision of a novel pallet of the aforementioned feature wherein the support members are provided with lift fork receiving apertures whereby the pallet can be picked up from four sides.

Other features and advantages of this present invention will become more apparent upon a perusal of the following specifications, taken in conjunction with the accompanying drawings wherein:

FIG. 1 is a perspective view of an assembled pallet comprising one embodiment of the present invention, FIG. 2 is a cross-sectional view of the structure of FIG. 1 taken along line 2—2 in the direction of the arrows, FIG. 2A is a cross-sectional view similar to FIG. 2 comprising another embodiment of the present invention, FIG. 3 is a perspective view of an assembled pallet illustrating another embodiment of the present invention, FIG. 4 is a cross-sectional view of the structure of FIG. 3 taken along line 4—4 in the direction of the arrows and, FIG. 4A is a cross-sectional view similar to FIG. 4 showing an alternative embodiment of the present invention.

Referring to FIGS. 1 and 2 of the drawing, a plurality of tubular members or boxes or sleeves 10 are arranged in parallel spaced apart relation. These tubular members 10 are made of an inexpensive though durable material such as heavy-duty cardboard. These tubular members 10 are of rectangular cross-section and are made by scoring and folding the cardboard along a number of lines the length thereof and securing the free ends of the cardboard together by such means as tape, glue, staples etc. In order to provide pallets of different widths the tubular members 10 are provided in a number of different lengths.

Each of the tubular members 10 is provided on opposing sides thereof with a plurality of spaced apart apertures 11 adapted to receive support members. Into these apertures 11 are inserted tubular support members 12, which are adapted to receive therein the lift forks of the lift truck. These tubular support members 12 can be made of an inexpensive though rigid material such as, for example, heavy-duty cardboard or Kraft veneer board. According to the embodiment of the present invention illustrated in FIGS. 1 and 2, the tubular support members 12 are of rectangular cross section and additional support is provided to the pallet by a plurality of rib support members 13 inserted through the several tubular members 10 by means of slot apertures 14 in the opposite sides thereof.

As is evident from the above, different length pallets are made by sliding a different number of tubular members 10 on support members 12 of different desired lengths.

Also, the amount of open space in a pallet can be controlled by the number of tubular members 10 into which a particular length support member 12 is slidably inserted. This is desirable since one pallet may be used on goods packaged in one-size carton while another pallet is used for goods in another size carton.

In an alternative embodiment of the present invention illustrated in FIG. 2A, a four-way pallet is provided by omitting the rib support members 13 and providing spaced-apart lift fork apertures 15 in the sides of each of the support members 12. While a row of these apertures 15 can lie outside the tubular members 10, the apertures 15 preferably are located within a tubular member 10 so that each lift fork will lift upon the top of a tubular member 10 as well as the top of the support members 12.

In another embodiment of the present invention illustrated in FIGS. 3 and 4, the support members 16 are inverted channel members or open-bottomed support members, trapezoidal in cross section. These channel-shaped support members 16 provide greater strength and stability to the pallet.

In still another embodiment of the present invention illustrated in FIG. 4A, channel shaped support members $16^1$ are provided with a closed bottom so that that the support member $16^1$ is tubular and is provided with spaced-apart lift fork receiving apertures 15 in the sides thereof, thereby providing a four-way pallet in much the same way as was described with reference to FIG. 2A above.

While a closed bottom for the support member of a four-way pallet is not necessary, this structure is preferable since the pallet constructed in this manner will be much more sturdy than one without a closed bottom support member.

Since many changes and modifications can be made without departing from the spirit of the invention this description is to be taken as purely illustrative and not in a limiting sense.

What is claimed is:

1. An expendable material handling pallet comprising, in combination, a plurality of boxes aligned in substantially parallel spaced apart relation to one another, each of said boxes provided with a top panel having a top surface for receiving and supporting a load, a bottom panel, and side panels interconnecting said top and bottom panels, said side panels provided with spaced apart apertures, and a plurality of spaced apart support members aligned substantially perpendicular to the longitudinal axis of said boxes, said support members passing through said apertures of said boxes and extending from said top panels to said bottom panels to support said boxes and hold said boxes in spaced apart relation.

2. An expendable material handling pallet comprising, in combination, a plurality of boxes aligned in substantially parallel spaced apart relation to one another, each of said boxes provided with a top panel having a top surface for receiving and supporting a load, a bottom panel, and side panels interconnecting said top and bottom panels, said side panels provided with spaced apart apertures, and a plurality of spaced apart support members aligned substantially perpendicular to the longitudinal axis of said boxes, each of said support members having at least three sides, said support members passing through said apertures of said boxes with two of said three sides extending from said top panels to said bottom panels to support said boxes and hold said boxes in spaced apart relation.

3. An expendable material handling pallet comprising, in combination, a plurality of first open-ended boxes aligned in substantially parallel spaced apart relation to one another, each of said boxes provided with a top panel having a top surface for receiving and supporting a load, a bottom panel, and side panels interconnecting said top and bottom panels, each of said side panels provided with spaced apart apertures and a plurality of second open-ended boxes aligned substantially perpendicular to the longitudinal axis of said first boxes, each of said second boxes having top, bottom and side panels, said second boxes passing through said apertures of said first boxes with the side panels of said second boxes extending from said top panel to said bottom panel of said first boxes to support said first boxes and hold said first boxes in spaced apart relation.

References Cited in the file of this patent

UNITED STATES PATENTS

| 2,503,562 | Porter | Apr. 11, 1950 |
| 2,639,050 | Hoffman | May 19, 1953 |
| 2,685,398 | King | Aug. 3, 1954 |
| 2,904,297 | Hamilton | Sept. 15, 1959 |
| 2,908,464 | Traudt et al. | Oct. 13, 1959 |
| 2,958,494 | Lovegreen | Nov. 1, 1960 |

FOREIGN PATENTS

| 139,272 | Australia | Nov. 2, 1950 |